United States Patent
Jonasson et al.

(10) Patent No.: US 9,900,814 B2
(45) Date of Patent: Feb. 20, 2018

(54) FIRST NETWORK NODE, A SECOND NETWORK NODE AND METHODS RELATING TO HANDOVER IN A WIRELESS COMMUNICATIONS NETWORK

(71) Applicant: Telefonaktiebolaget LM Ericsson (publ), Stockholm (SE)

(72) Inventors: Patrik Jonasson, Nykil (SE); Lisa Boström, Solna (SE); Stefan Engström, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/315,615

(22) PCT Filed: Jun. 9, 2014

(86) PCT No.: PCT/SE2014/050689
§ 371 (c)(1),
(2) Date: Dec. 1, 2016

(87) PCT Pub. No.: WO2015/190954
PCT Pub. Date: Dec. 17, 2015

(65) Prior Publication Data
US 2017/0208515 A1   Jul. 20, 2017

(51) Int. Cl.
*H04W 36/00*   (2009.01)
*H04W 36/04*   (2009.01)
(Continued)

(52) U.S. Cl.
CPC ....... *H04W 36/04* (2013.01); *H04W 36/0061* (2013.01); *H04W 36/08* (2013.01);
(Continued)

(58) Field of Classification Search
CPC . H04W 36/0055; H04W 36/14; H04W 36/30; H04W 72/042; H04W 36/08;
(Continued)

(56) References Cited

U.S. PATENT DOCUMENTS

| | | | |
|---|---|---|---|
| 2010/0046476 A1* | 2/2010 | Qiu | H04W 36/02 370/331 |
| 2011/0149913 A1 | 6/2011 | Park et al. | |

(Continued)

FOREIGN PATENT DOCUMENTS

| | | |
|---|---|---|
| EP | 2348771 A1 | 7/2011 |
| EP | 2389032 A1 | 11/2011 |

(Continued)

OTHER PUBLICATIONS

3GPP, "3rd Generation Partnership Project; Technical Specification Group Radio Access Network; Evolved Universal Terrestrial Radio Access (E-UTRA); User Equipment (UE) radio transmission and reception (Release 11)", 3GPP TS 36.101 V11.3.0 (Dec. 2012), Dec. 2012, 1-393.

(Continued)

*Primary Examiner* — Olumide T Ajibade Akonai
(74) *Attorney, Agent, or Firm* — Murphy, Bilak & Homiller, PLLC (57) ABSTRACT

A method in a first network node for handling a handover preparation failure between a first cell and a second cell in a wireless communication network. The first cell is served by the first network node and the second cell is served by a second network node. The second cell is configured for downlink operation only. The first network node transmits (401) to the second network node a handover request for handover of a user equipment from the first cell to the second cell. The first network node receives (402) from the second network node an indication. The indication indicates (Continued)

the handover preparation failure, and further indicates that the handover preparation failure is caused by the second cell being configured for downlink operation only. The first network node selects (403) a cell for handover based on the received indication.

28 Claims, 8 Drawing Sheets (51) Int. Cl.
*H04W 36/08* (2009.01)
*H04W 36/14* (2009.01)
*H04W 64/00* (2009.01)
*H04W 92/20* (2009.01)

(52) U.S. Cl.
CPC ............ *H04W 36/14* (2013.01); *H04W 64/00* (2013.01); *H04W 92/20* (2013.01)

(58) Field of Classification Search
CPC ........... H04W 36/165; H04W 36/0016; H04W 36/38; H04W 72/04
USPC .................................. 455/436–444; 370/331
See application file for complete search history.

(56) References Cited

U.S. PATENT DOCUMENTS

| | | | |
|---|---|---|---|
| 2012/0190368 A1* | 7/2012 | Zhang ............... | H04W 36/0055 455/436 |
| 2013/0163439 A1* | 6/2013 | Jia ....................... | H04W 92/20 370/242 |
| 2015/0189532 A1* | 7/2015 | Dimou ............... | H04W 28/021 455/418 |

FOREIGN PATENT DOCUMENTS

| | | |
|---|---|---|
| EP | 2618609 A1 | 7/2013 |
| WO | 2010129865 A2 | 11/2010 |
| WO | 2014037789 A2 | 3/2014 |

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.6.0, Dec. 2013, 1-274.

3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.3.0 (Mar. 2013), Mar. 2013, 1-274.

3GPP, "3rd Generation Partnership Project; Technical Specification Goup Radio Access Network; Evolved Universal Terrestrial Radio Access Network (E-UTRAN); X2 application protocol (X2AP) (Release 11)", 3GPP TS 36.423 V11.3.0 (Dec. 2012), Dec. 2012, 1-141.

3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.5.0, Jun. 2013, 1-143.

3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.0.0, Mar. 2012, pp. 1-134.

3GPP, "Clarification on DL-only carrier", 3GPP TSG RAN WG3 Meeting #76, R3-121255, MediaTek, Prague, Czech, May 21-25, 2012, pp. 1-3.

3GPP, "Support for DL-only Carrier for CA", 3GPP TSG-RAN WG3 #75bis, R3-120762, Alcatel-Lucent, AT&T, San Jose del Cabo, Mexico, Mar. 26-30, 2012, pp. 1-3.

* cited by examiner

FIRST NETWORK NODE, A SECOND NETWORK NODE AND METHODS RELATING TO HANDOVER IN A WIRELESS COMMUNICATIONS NETWORK

TECHNICAL FIELD

Embodiments herein relate to a first network node, a second network node and methods therein. In particular, they relate to handover in a wireless communications network.

BACKGROUND

Communication devices such as User Equipments (UE) are also known as e.g. mobile terminals, wireless terminals and/or mobile stations. User equipments are enabled to communicate wirelessly in a wireless communications network, sometimes also referred to as a wireless communication system, a cellular communications network, a cellular radio system or a cellular network. The communication may be performed e.g. between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, laptops, or surf plates with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another user equipment or a server.

The wireless communications network covers a geographical area which is divided into cell areas, wherein each cell area is served by a base station, e.g. a Radio Base Station (RBS), which sometimes may be referred to as e.g. "eNB", "eNodeB", "NodeB" or "B node" depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations. In the context of this disclosure, the expression Downlink (DL) is used for the transmission path from the base station to the user equipment. The expression Uplink (UL) is used for the transmission path in the opposite direction i.e. from the user equipment to the base station.

In some RANs, such as in the Evolved Universal Terrestrial Radio Access Network (E-UTRAN), several base stations may be connected, e.g. by landlines or microwave, to each other.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE is controlled by the radio base station.

Figure 1A:
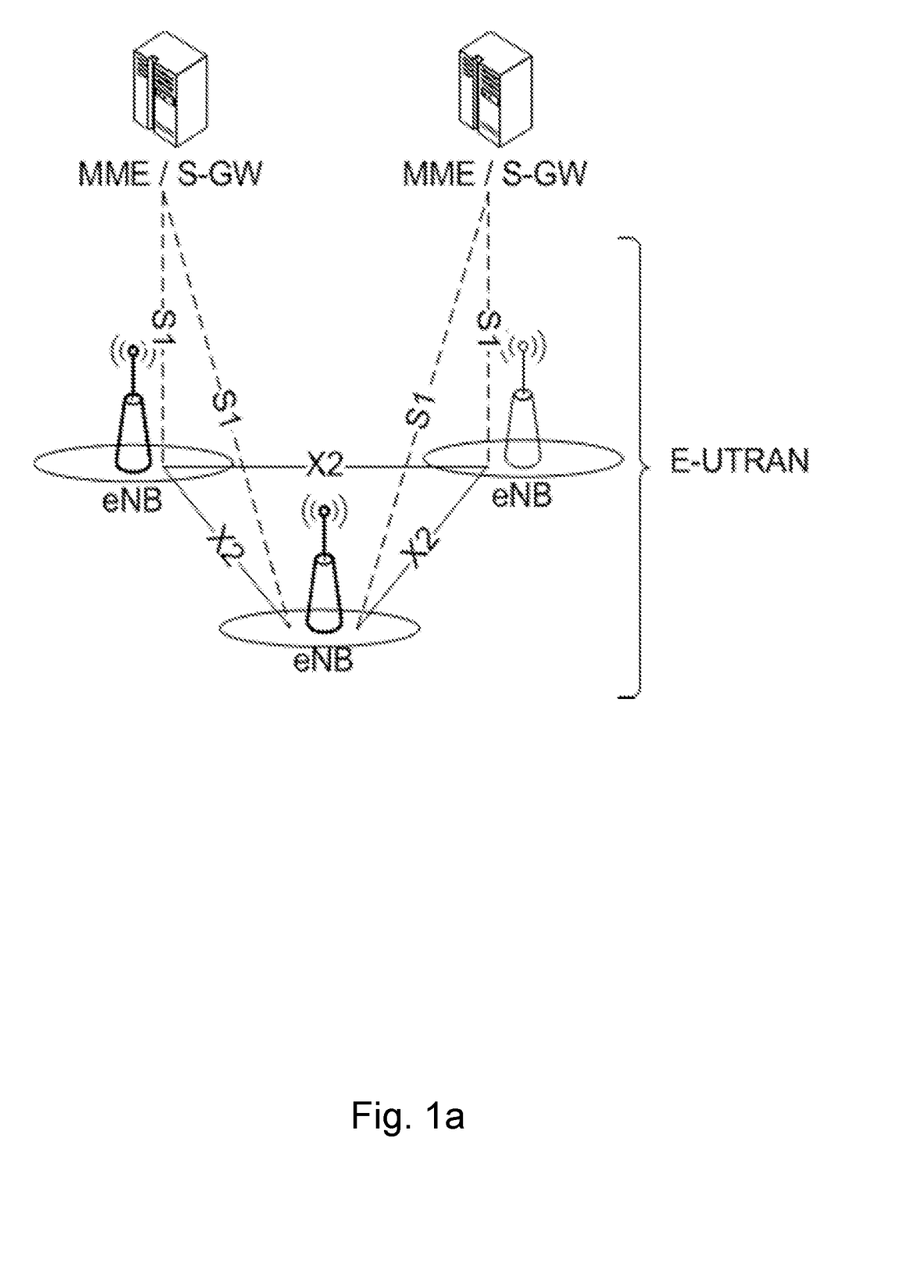
FIG. 1a is a schematic block diagram illustrating an LTE network architecture.

The 3GPP is currently working on further standardization of the LTE concept. The architecture of the LTE system is shown in FIG. 1a, including radio access nodes (eNBs) and interfaces to evolved packet core nodes, such as Mobility Management Entity (MME) and Serving Gateway (S-GW). The interface between eNBs is referred to as X2, and the interface between eNB and MME/S-GW is denoted S1. The application layer signalling, on the S1 interface, S1-AP, is standardized in 3GPP TS 36.413, and on the X2 interface, X2-AP, in 3GPP TS 36.423.

Carrier Aggregation

Aggregation of carriers is supported for LTE since 3GPP Release-10 (LTE Rel-10) with individual bandwidths up to 20 MHz, which is the maximal LTE Rel-8/9 carrier bandwidth. Hence, an LTE Rel-10 operation wider than 20 MHz is possible and appear as a number of LTE carriers to an LTE Rel-10 user equipment. Carrier aggregation is an optional feature in LTE Rel-10 with enhancements to this feature added in 3GPP releases later than 10.

The LTE Rel-10 standard supports signalling for up to 5 aggregated carriers where each carrier is limited in the RF specifications to have one of six bandwidths, namely 6, 15, 25, 50, 75 or 100 Resource Blocks (RB), corresponding to 1.4, 3, 5, 10, 15 and 20 MHz respectively.

Carrier aggregation is called contiguous or non-contiguous intra-band if the carriers all belong to the same 3GPP operating frequency band.

Inter-band carrier aggregation is the case when there is at least one carrier in a different 3GPP operating frequency band.

The number of aggregated carriers, also called Component Carriers (CC), as well as the bandwidth of the individual CC, may be different for uplink and downlink. A symmetric configuration refers to the case where the number of CCs in downlink and uplink is the same, whereas an asymmetric configuration refers to the case when the numbers of CCs are different in downlink and uplink. However, an asymmetric configuration where the number of uplink CCs is higher than the number of downlink CCs is not allowed in LTE Rel-10.

It is important to note that the number of CCs configured in the network may be different from the number of CCs seen by a user equipment. A user equipment may for example support more downlink CCs than uplink CCs, even though the network offers the same number of uplink and downlink CCs. From a network perspective, in LTE Rel-10 all cells should be Rel-8/9 compatible, for example they must comprise one uplink and one downlink CC. In LTE Rel-11 and later, new carrier types which are not Rel-8/9 compatible are supported, for example that a cell of a certain frequency band may comprise a downlink CC only from a network perspective.

During initial access, an LTE Rel-10 user equipment behaves similar to an LTE Rel-8/9 user equipment. The serving cell, in which the UE ends up at initial access, is referred to as the UE's Primary Cell (PCell).

Upon successful connection to the network, a user equipment may—depending on its own capabilities and depending on the network—be configured with additional CCs in the UL and DL. These additional serving cells, which are configured for the UE, are referred to as Secondary Cells (SCell).

Downlink-Only Cells for the Purpose of Carrier Aggregation

In LTE Frequency Division Duplex (FDD) systems, most frequency bands are defined with one uplink band and one downlink band, to facilitate two-way communication.

In the special case of carrier aggregation, a UE is connected to a cell using a set of frequencies but may also simultaneously use a second cell using another set of frequencies. The second cell may by the UE either be used for both UL and DL transmission or only be used for DL transmission. Typically, the cell used as a secondary cell, has both an UL and a DL carrier from an eNB point of view, even if the UE is configured to only utilize e.g. the DL carrier of this cell. Then the eNB will still have an UL frequency configured for this cell and will listen to it, even if not all UEs are configured to have any UL transmission on this frequency.

There is however special cases where a cell from an eNB point of view may be deployed with only a DL. This means that the eNB is typically not listening on the UL frequency associated with the DL frequency of this cell or is ignoring it. Alternatively, the DL frequency has no associated UL frequency. In the 3GPP standards there is currently only one frequency band defined as DL-only, i.e. band 29 as defined in 3GPP TS 36.101, meaning that it has no UL E-UTRA Absolute Radio Frequency Channel Number (EARFCN) defined, only a DL EARFCN. Other bands may be defined in the 3GPP standards with both UL EARFCN and DL ERAFCN, but it may for the operator anyway be desirable to use these bands for a DL-only cell. Cells deployed as DL-only cells from a network perspective may only be utilized for the purpose of secondary cells providing additional resources for DL transmission. In 3GPP terminology, what is referred to as a DL-only cell in this document, is sometimes referred to as a Supplementary Downlink (SDL) cell.

A UE ordered to do measurements for finding neighbour cells, cannot see any difference between cells configured for both UL and DL and cells configured for DL only. It will report all neighbour cells that fulfil the measurement criteria as possible candidates for mobility actions.

When the Automatic Neighbour Relations (ANR) function in an eNB finds the DL-only cell in a frequency band defined for both uplink and downlink, e.g. in a frequency band other than band 29, the DL-only cell is automatically configured as a neighbour cell. The eNB assumes that the DL-only cell supports both UL and DL transmission and thus is available for handover. However, all attempts to make handover to this neighbour DL-only cell will fail. Further results are inconsistent network configuration, i.e. the DL-only cell will be described as configured for DL and UL in the neighbouring eNBs and as configured for DL-only in the serving eNB, connection drops and unnecessary load on network nodes.

SUMMARY

It is therefore an object of embodiments herein to provide an improved way of handling a handover preparation failure between two neighbour cells.

According to a first aspect of embodiments herein, the object is achieved by a method in a first network node for handling a handover preparation failure between a first cell and a second cell in a wireless communication network. The first cell is served by the first network node and the second cell is served by a second network node. The second cell is configured for downlink operation only. The first network node transmits to the second network node a request for handover of a user equipment from the first cell to the second cell.

The first network node receives from the second network node an indication. The indication indicates the handover preparation failure, and further indicates that the handover preparation failure is caused by the second cell being configured for downlink operation only.

The first network node selects a cell for handover based on the received indication.

According to a second aspect of embodiments herein, the object is achieved by a first network node configured to handle a handover preparation failure between a first cell and a second cell in a wireless communication network. The first cell is configured to be served by the first network node and the second cell is configured to be served by a second network node. The second cell is further configured for downlink operation only. The first network node is configured to transmit to the second network node a request for handover of a user equipment from the first cell to the second cell.

The first network node is further configured to receive from the second network node an indication. The indication indicates the handover preparation failure, and further indicates that the handover preparation failure is caused by the second cell being configured for downlink operation only.

The first network node is further configured to select a cell for handover based on the received indication.

According to a third aspect of embodiments herein, the object is achieved by a method in a second network node for handling a handover preparation failure between a first cell and a second cell in a wireless communication network. The first cell is served by a first network node and the second cell is served by the second network node. The second cell is configured for downlink operation only. The second network node receives from the first network node a request for handover of a user equipment from the first cell to the second cell. The second network node further transmits to the first network node an indication. The indication indicates the handover preparation failure, and further indicates that the handover preparation failure is caused by the second cell being configured for downlink operation only.

According to a fourth aspect of embodiments herein, the object is achieved by a second network node configured to handle a handover preparation failure between a first cell and a second cell in a wireless communication network. The first cell is configured to be served by a first network node and the second cell is configured to be served by the second network node. The second cell is further configured for downlink operation only. The second network node is configured to receive from the first network node a request for handover of a user equipment from the first cell to the second cell.

The second network node is further configured to transmit to the first network node an indication. The indication indicates the handover preparation failure, and further indicates that the handover preparation failure is caused by the second cell being configured for downlink operation only.

Since the first network node selects the cell for handover based on the received indication that the handover preparation failure is caused by the second cell being configured for downlink operation only, from the second network node, the first network node avoids unnecessary handover attempts to the second cell which is configured for downlink only.

An advantage with embodiments herein is that cells using a frequency band which has both UL and DL spectrum, e.g. other bands than band 29, which is currently the only band defined for FDD DL only in 3GPP TS 36.101, may be used as secondary cells for carrier aggregation, without resulting in drawbacks as inconsistent network configuration, connection drops or unnecessary load on network nodes.

Another advantage is that, in the case of EUTRAN, embodiments herein may be used regardless if an X2 interface is available between the eNBs or not.

A further advantage is that the possibility for an operator of making DL-only deployments on frequency bands typically configured for UL and DL operation enable DL carrier aggregation speeds at low cost in rural areas.

Although embodiments herein are described using FDD as an example, DL-only cells may also be used for Time Division Duplex (TDD) bands as well as for FDD bands. A DL-only cell in the TDD context may be a cell for which DL subframes are used only.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed.

The 3GPP standard is currently only prepared to support a DL-only cell for band 29.

This has the consequence that when the ANR function in a neighbour eNB finds the DL-only cell, in a frequency band other than 29, and the cell is automatically configured as a neighbour cell, the cell is assumed to support both UL and DL transmission. All attempts to make handover to this neighbour cell will fail.

Embodiments herein make it possible to include a handover reject cause value over S1 and X2 saying that handover is rejected due to the target cell is configured as a DL-only cell. This may be done by extending existing enumerations.

The network node that in return receives the handover reject with this cause value, then learns that the neighbour cell is configured for DL only and may not be used as target cell for handover.

As the configuration of the DL-only cell may change to DL and UL, the network node may later learn by incoming handover from the neighbour cell, or by regular handover attempts to the neighbour cell, that the neighbour cell has changed configuration and may then be used as a handover target cell.

Figure 1B:
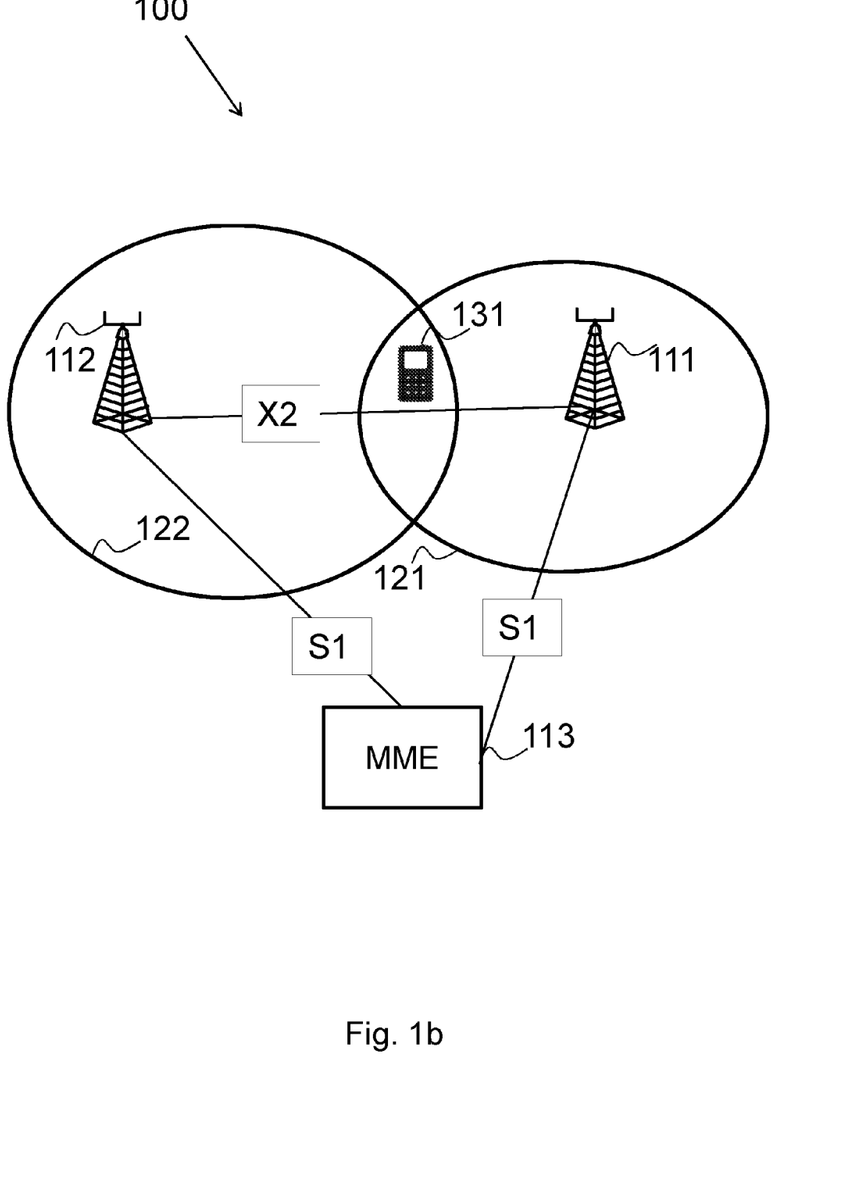
FIG. 1b is a schematic block diagram illustrating embodiments of a wireless communications network.

FIG. 1b depicts a wireless communications network 100 in which embodiments herein may be implemented. The wireless communications network 100 may for example be an LTE network, an UMTS network, or a WiFi network. Embodiments herein will be exemplified with an LTE network.

The wireless communications network 100 comprises a first network node 111. The first network node 111 is also referred to herein as a source network node. The wireless communications network 100 further comprises a second network node 112. The second network node 112 is also referred to herein as a candidate or target network node. The first and second network nodes 111, 112 may each be a base station. The base station may also be referred to as a NodeB, an evolved Node B (eNB, eNode B), Access Point Base Station, base station router, or any other network unit capable of communicating with a user equipment within a cell served by the base station, depending e.g. on the radio access technology and terminology used.

The first network node 111 may communicate directly with the second network node 112 over an interface, such as the X2 interface in LTE. The first network node 111 may also communicate with the second network node 112 via a third network node 113, such as an MME, over a second interface, such as the S1 interface in LTE. This may be the case when there is no direct interface between the first network node 111 and the second network node 112.

The first network node 111 serves a first cell 121, also referred to as a source cell, while the second network node 112 serves a second cell 122, also referred to as a candidate cell or target cell. The second cell 122 is configured for DL operation only. The second cell 122 may further be configured for downlink operation only on a frequency band defined for both downlink and uplink operation, for example a frequency band other than band 29 as currently defined by 3GPP.

The first network node 111 communicates with user equipments in the first cell 121, such as a user equipment 131, also referred to as a UE, a terminal or a wireless device, which is to be handed over to a cell different from the first cell 121. The handover may for example be due to mobility of the user equipment 131.

The user equipment 131 may e.g. be a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user.

Figure 2:
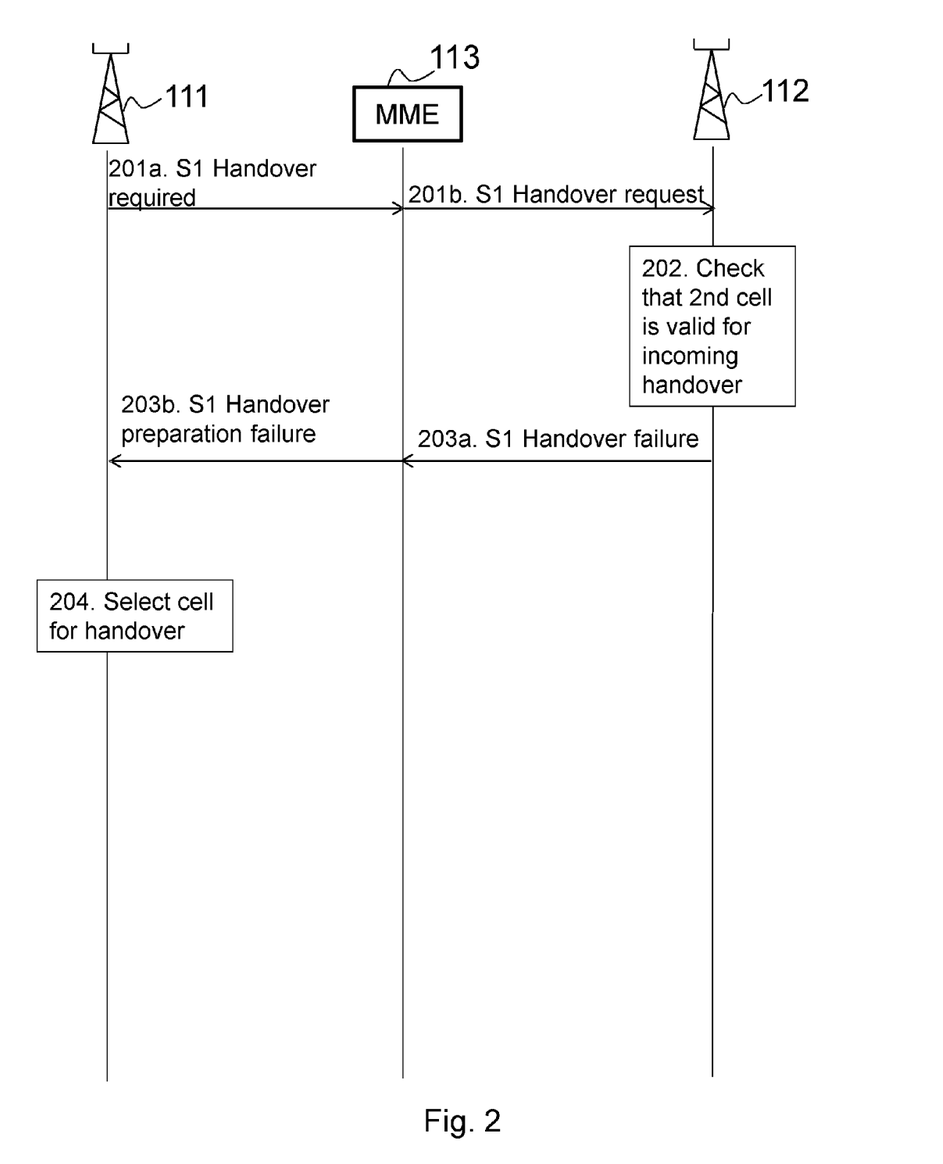
FIG. 2 is a combined signalling diagram and flowchart illustrating embodiments of a method in a wireless communications network.
Figure 3:
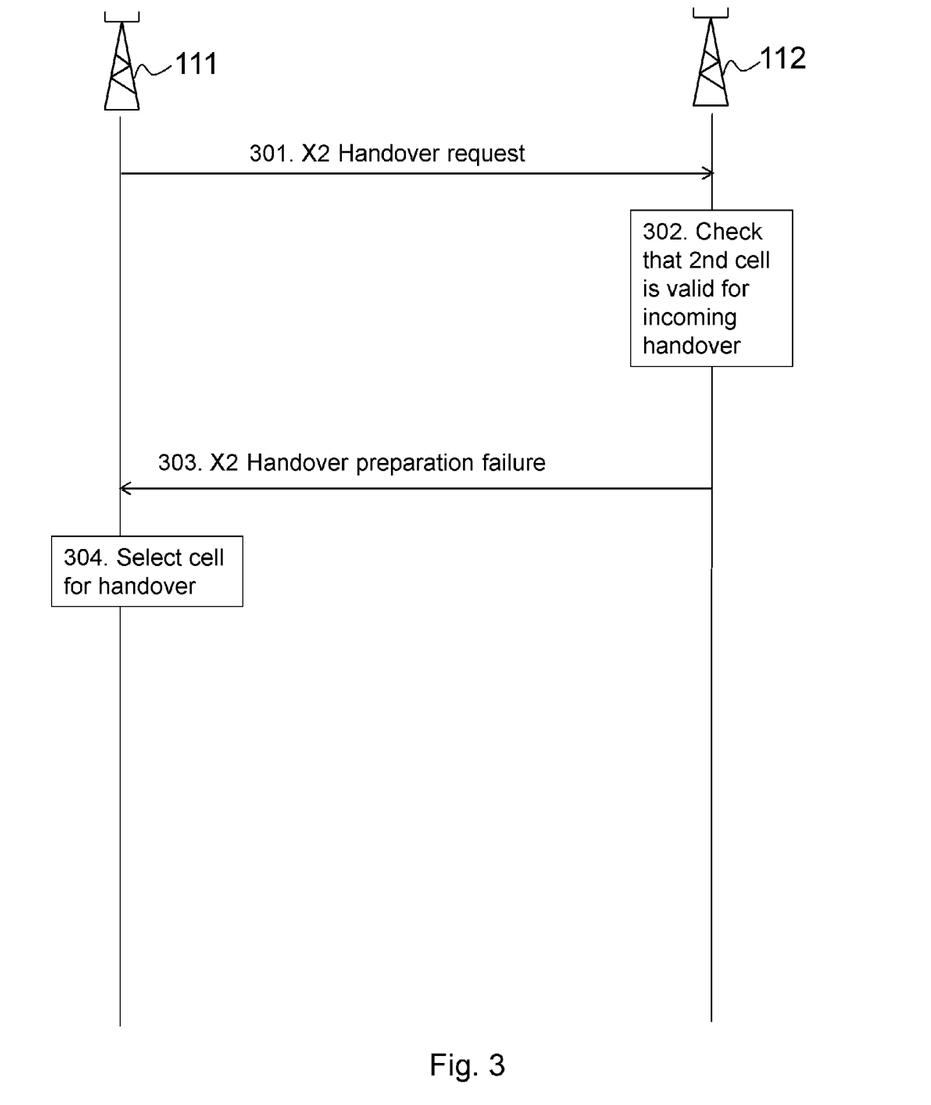
FIG. 3 is a combined signalling diagram and flowchart illustrating further embodiments of a method in a wireless communications network.

Actions for handling a handover preparation failure between the first cell 121 and the second cell 122 in the wireless communication network 100, will now be described with reference to a first combined flowchart and signalling diagram depicted in FIG. 2 and a second combined flowchart and signalling diagram depicted in FIG. 3. FIG. 2 describes a first scenario in which there is not an X2 interface between the first network node 111 and the second network node 112. Thus the two network nodes 111, 112 communicate with each other via the third network node 113. FIG. 3 describes a second scenario in which there is an X2 interface between the first network node 111 and the second network node 112. Thus the two network nodes 111, 112 communicate with each other directly.

As mentioned above, the first cell 121 is served by the first network node 111 and the second cell 122 is served by the second network node 112. The second cell 122 is configured for downlink operation only. The second cell 122 may further be configured for downlink operation only on a frequency band defined for both downlink and uplink operation, i.e. on a frequency band which has both UL and DL spectrum, for example a frequency band other than band 29 as currently defined by 3GPP.

Action 201a and 201b/301

The first network node 111 wants to do a handover of the user equipment 131 from the first cell 121 to the second cell 122, for example in order to support mobility. This may have been triggered by measurements performed by the user equipment 131 and sent to the first network node 111. The first network node 111 assumes that the second cell 122 is configured to support both DL and UL operation. Thus the first network node 111 transmits to the second network node 112 a request for handover of the user equipment 131 from the first cell 121 to the second cell 122.

In FIG. 2 the handover request is comprised in an S1 Handover required message, which is transmitted to the third network node 113 in action 201a. The third network node 113 then forwards the handover request to the second network node 112 in action 201b, for example in an S1 handover request message.

In FIG. 3 the handover request is comprised in an X2 Handover request sent directly to the second network node 112 in action 301.

Figure 4:
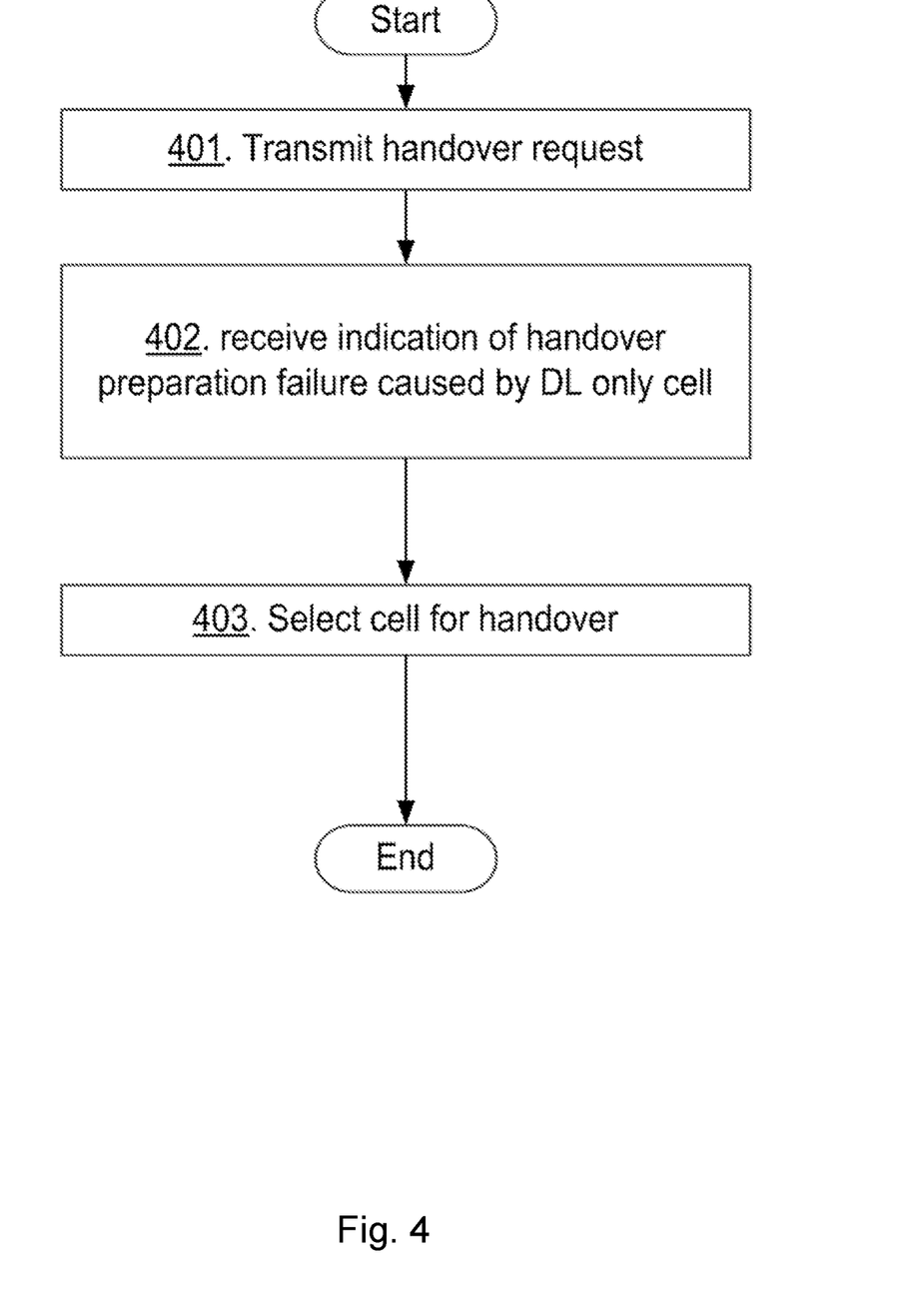
FIG. 4 is a flowchart depicting embodiments of a method in a first network node.
Figure 6:
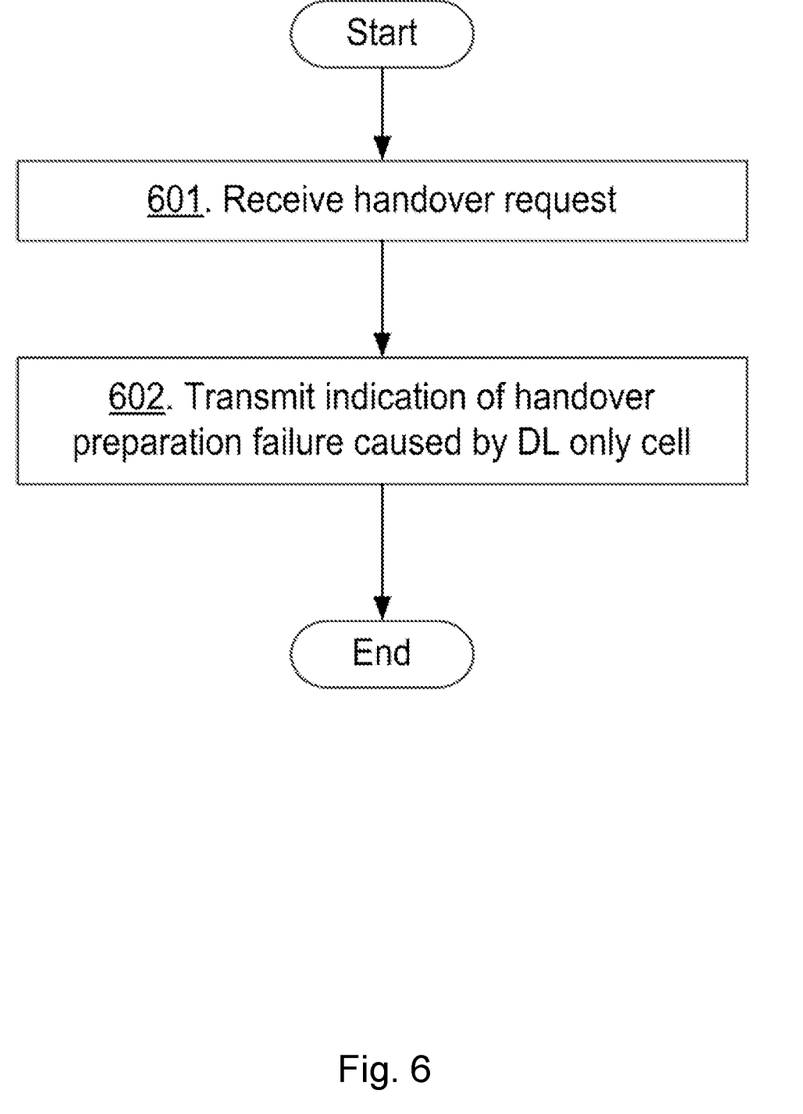
FIG. 6 is a flowchart depicting embodiments of a method in a second network node.

These actions relate to action 401 and 601 below.

Action 202/302

When the second network node 112 has received the request for handover it checks that the second cell 122 is valid for an incoming handover. The second network node 112 finds that the second cell 122 is configured for DL only. This means that the second cell 122 is not valid for the incoming handover.

Action 203a and 203b/303

In consequence of the second cell 122 not being valid for incoming handover the second network node 112 transmits to the first network node 111 an indication of the handover preparation failure. The indication further indicates that the handover preparation failure is caused by the second cell 122 being configured for downlink operation only.

In the first scenario the indication is transmitted via the third network node 113 as seen in FIG. 2. In the case that the third network node 113 is an MME the second network node 112 transmits the indication to the MME in action 203a, comprised in a handover failure message over the S1 interface. The MME then forwards the indication to the first network node 111 in a handover preparation failure message in action 203b. When the third network node 113 is an MME a new cause value may be added to Radio Network Layer Cause in the handover failure message. The new cause value may in more detail explain that handover is rejected due to the target cell is configured for DL operation only. The new cause value may for example be called DlOnlyCell or supplementalDl.

In the second scenario the indication is comprised in a handover preparation failure message transmitted directly to the first network node 111 over the X2 interface in action 303 as seen in FIG. 3. A new cause value may be added to Radio Network Layer Cause in the handover preparation failure message. The new cause value may in more detail explain that handover is rejected due to the target cell is configured for DL operation only. The new cause value may for example be called DlOnlyCell or supplementalDl.

These actions relate to action 402 and 602 below.

Action 204/304

Upon receiving the failure message comprising the indication of handover failure and the cause of the failure the first network node 111 learns that the second cell 122 is configured for DL only and cannot be used as target for handover for a period of time. As a consequence the first network node 111 selects a cell for handover based on the received indication. That is the first network node 111 will exclude the second cell 122 from future handover attempts for a period of time and select another cell for handover. The information about the configuration of the second cell 122 may be saved for as long as needed. As the configuration of the DL only cell may change to both DL and UL, the first network node 111 may later learn by incoming handover from the second cell 122, or by regular handover attempts to the second cell 122, that the second cell 122 has changed configuration and may then be used as a handover target cell. Regular handover attempts may for example be performed once every week.

This action relates to action 403 below.

In some example embodiments the first network node 111 is the same network node as the second network node 112. Depending on the actual hardware implementation the actions of receiving and transmitting may be performed within the network node.

A method will now be described from a perspective of the first network node 111 comprising both alternative methods described above. Thus, embodiments of a method in the first network node 111 for handling the handover preparation failure between the first cell 121 and the second cell 122 in the wireless communication network 100, will be described with reference to a flowchart depicted in FIG. 4. As mentioned above, the first cell 121 is served by the first network node 111 and the second cell 122 is served by the second network node 112. The second cell 122 is configured for downlink operation only. The second cell 122 may further be configured for downlink operation only on a frequency band defined for both downlink and uplink operation.

The method comprises the following actions, which actions may be taken in any suitable order.

Action 401

The first network node 111 wants to do a handover of the user equipment 131 from the first cell 121 to the second cell 122. The first network node 111 assumes that the second cell 122 is configured to support both DL and UL operation. Thus the first network node 111 transmits to the second network node 112 a request for handover of a user equipment 131 from the first cell 121 to the second cell 122.

The handover request may be comprised in the S1 Handover required message, which is transmitted to the third network node 113 as described above in action 201a. The third network node 113 then forwards the handover request to the second network node 112 as described above in action 201b, for example in an S1 handover request message.

In some embodiments the handover request is comprised in an X2 Handover request sent directly to the second network node 112 as described above in action 301.

Action 402

In response to the request for handover the first network node 111 receives from the second network node 112 an indication, which indicates the handover preparation failure.

The indication further indicates that the handover preparation failure is caused by the second cell 122 being configured for downlink operation only.

In the first scenario the indication is received via the third network node 113. The third network node 113 may be an MME and the received indication may be comprised in the handover preparation failure message transmitted over the S1 interface as described above in action 203b.

In the second scenario the indication is comprised in the handover preparation failure message transmitted over the X2 interface as described above in action 303.

Action 403

Upon receiving the failure message comprising the indication of handover failure and the cause of the failure the first network node 111 learns that the second cell 122 is configured for DL only and cannot be used as target for handover. As a consequence the first network node 111 selects the cell for handover based on the received indication. Thus, the first network node 111 excludes the second cell 122 from the selection process and selects another cell due to the indication from the second network node 112. The first network node 111 may select the cell for handover based on the received indication for a period of time. In other words, the first network node 111 may take the received indication into account for a period of time, e.g. for a week, when selecting a cell for handover.

In some embodiments the first network node 111 selects the cell for handover based on the received indication until the first network node 111 is provided with an indication that the configuration of the second cell 122 has changed to both downlink and uplink operation.

For example, as the configuration of the DL only cell may change to DL and UL, the first network node 111 may later learn by incoming handover from the second cell 122, or by regular handover attempts to the second cell 122, that the second cell 122 has changed configuration and may then be used as the handover target cell. Regular handover attempts may for example be performed once every week.

This action relates to action 204/304 above.

In some example embodiments the first network node 111 is the same network node as the second network node 112. Then the receiving and the transmitting may be performed within the network node.

Figure 5:
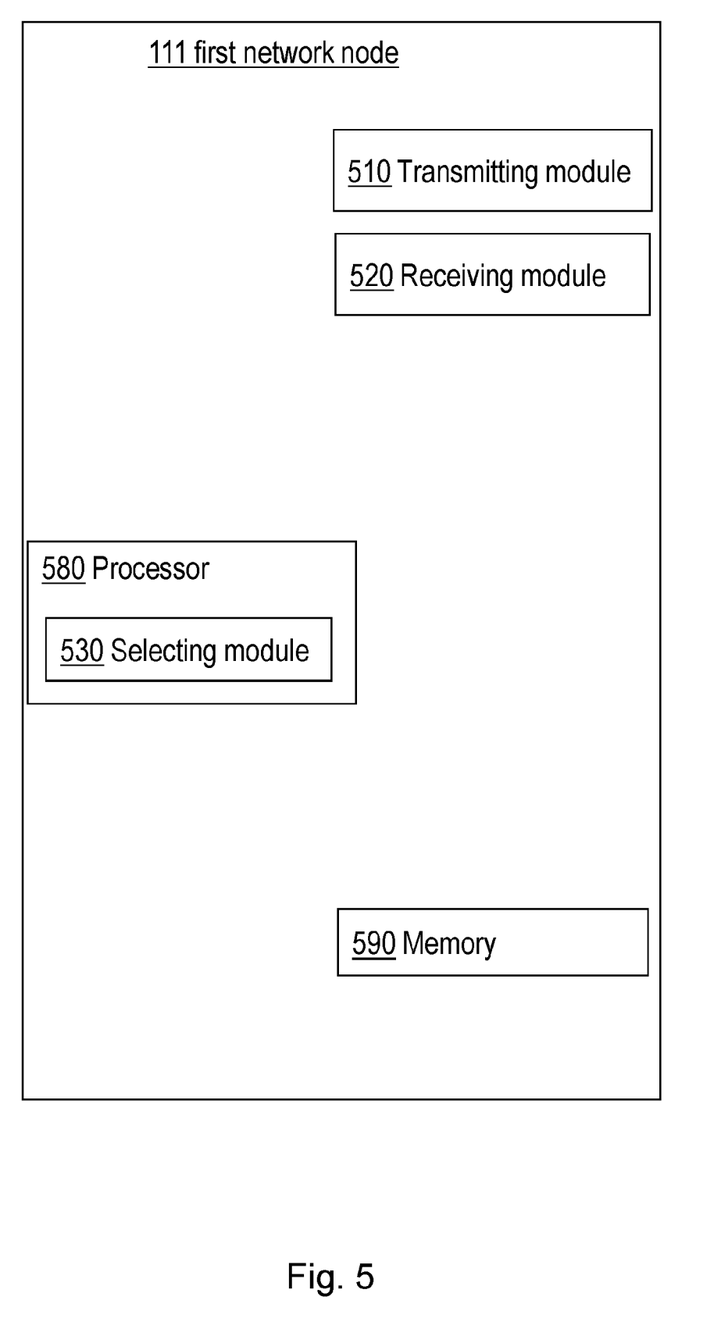
FIG. 5 is a schematic block diagram illustrating embodiments of a first network node.

To perform the method actions of handling the handover preparation failure between the first cell 121 and the second cell 122 in the wireless communication network 100 described above in relation to FIG. 4, the first network node 111 comprises the following arrangement depicted in FIG. 5. The first network node 111 is configured to handle the handover preparation failure between the first cell 121 and the second cell 122 in the wireless communication network 100. As mentioned above, the first cell 121 is configured to be served by the first network node 111 and the second cell 122 is configured to be served by the second network node 112. The second cell 122 is configured for downlink operation only. The second cell 122 may further be configured for downlink operation only on a frequency band defined for both downlink and uplink operation.

The first network node 111 is configured to, e.g. by means of a transmitting module 510 configured to, transmit to the second network node 112 the request for handover of the user equipment 131 from the first cell 121 to the second cell 122.

The transmitting module 510 may be a transmitter in the first network node 111.

The first network node 111 is further configured to, e.g. by means of a receiving module 520 configured to, receive from the second network node 112 the indication which indicates the handover preparation failure. The indication further indicates that the handover preparation failure is caused by the second cell 122 being configured for downlink operation only.

The first network node 111 may further be configured to, e.g. by means of the receiving module 520 configured to, receive the indication via the third network node 113.

In some embodiments the first network node 111 is further configured to, e.g. by means of the receiving module 520 configured to receive the indication comprised in the handover preparation failure message transmitted over the S1 interface.

The first network node 111 may further be configured to, e.g. by means of the receiving module 520 configured to, receive the indication comprised in the handover preparation failure message transmitted over the X2 interface.

The receiving module 520 may be a receiver in the first network node 111.

The first network node 111 is further configured to, e.g. by means of a selecting module 530 configured to, select the cell for handover based on the received indication.

In some embodiments the first network node 111 is further configured, e.g. by means of the selecting module 530 being configured to, select the cell for handover based on the received indication for a period of time.

The first network node 111 may further be configured to, e.g. by means of the selecting module 530 being configured to, select the cell for handover based on the received indication until the first network node 111 is provided with an indication that the configuration of the second cell 122 has changed to both downlink and uplink operation.

The selecting module 530 may be comprised in a processor 580 of the first network node 111.

Further, the first network node 111 may be configured to be the same network node as the second network node 112. Then the first network node 111 may further be configured to transmit the handover request and to receive the indication within the network node.

The embodiments herein for handling the handover preparation failure between the first cell 121 and the second cell 122 in the wireless communication network 100 may be implemented through one or more processors, such as the processor 580 in the first network node 111 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 590 comprising one or more memory units. The memory 590 is configured to store e.g. the indication, configurations, and computer program code to perform the methods herein when being executed in the first network node 111.

Those skilled in the art will also appreciate that the transmitting module 510, receiving module 520 and selecting module 530 described above may refer to a combination of analogue and digital circuits, and/or one or more processors configured with software and/or firmware, e.g. stored in a memory, that when executed by the one or more processors such as the processor 580 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

A method will now be described from a perspective of the second network node 112. Thus, embodiments of a method in the second network node 112 for handling the handover preparation failure between the first cell 121 and the second cell 122 in the wireless communication network 100, will now be described with reference to a flowchart depicted in FIG. 6. As mentioned above, the first cell 121 is served by the first network node 111 and the second cell 122 is served by the second network node 112. The second cell 122 is configured for downlink operation only. The second cell 122 may further be configured for downlink operation only on a frequency band defined for both downlink and uplink operation.

The method comprises the following actions, which actions may be taken in any suitable order.

Action 601

The first network node 111 assumes that the second cell 122 is configured to support both DL and UL operation. Thus, the second network node 112 receives from the first network node 111 the request for handover of the user equipment 131 from the first cell 121 to the second cell 122.

This action relates to actions 201*a* and 201*b*/301 and 401 above.

Action 602

In consequence of the second cell 122 not being valid for incoming handover the second network node 112 transmits to the first network node 111 an indication of the handover preparation failure. The indication further indicates that the handover preparation failure is caused by the second cell 122 being configured for downlink operation only.

In the first scenario the indication is transmitted via the third network node 113.

The third network node 113 may be an MME. Then the indication is comprised in a handover failure message transmitted over an S1 interface as described above in action 203*a*. The MME then forwards the indication to the first network node 111 in a handover preparation failure message as described above in action 203*b*.

In the second scenario the indication is comprised in the handover preparation failure message transmitted over the X2 interface directly to the first network node 112 as described above in action 303.

This action relates to action 203*a* and 203*b*/303 and 402 above.

In some example embodiments the first network node 111 is the same network node as the second network node 112. Then the receiving and the transmitting may be performed within the network node.

Figure 7:
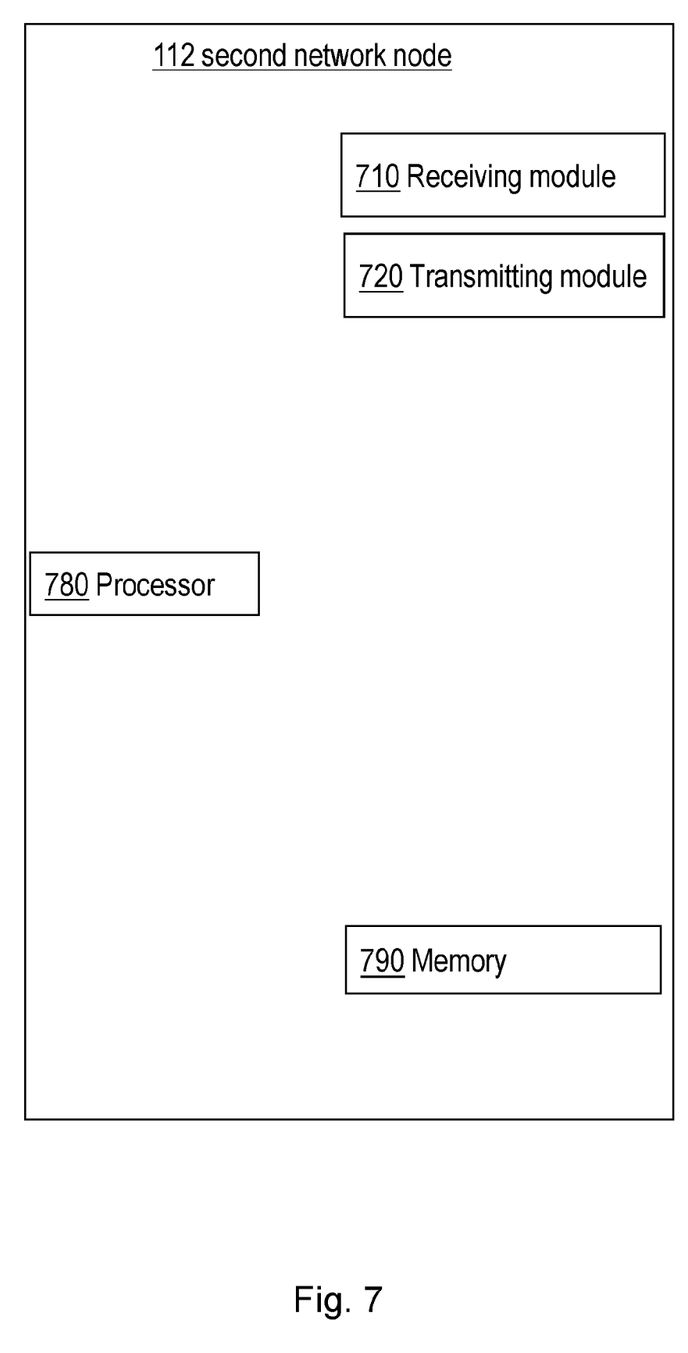
FIG. 7 is a schematic block diagram illustrating embodiments of a second network node.

To perform the method actions for handling the handover preparation failure between the first cell 121 and the second cell 122 in the wireless communication network 100, described above in relation to FIG. 6, the second network node 112 comprises the following arrangement depicted in FIG. 7. The second network node 112 is configured to handle the handover preparation failure between the first cell 121 and the second cell 122 in the wireless communication network 100.

As mentioned above, the first cell 121 is configured to be served by the first network node 111 and the second cell 122 is configured to be served by the second network node 112. The second cell 122 is configured for downlink operation only. The second cell 122 may further be configured for downlink operation only on a frequency band defined for both downlink and uplink operation.

The second network node 112 is configured to, e.g. by means of a receiving module 710 configured to, receive from the first network node 111 the request for handover of the user equipment 131 from the first cell 121 to the second cell 122.

The receiving module 710 may be a receiver in the second network node 112.

The second network node 112 is further configured to, e.g. by means of a transmitting module 720 configured to, transmit to the first network node 111 the indication, which indicates the handover preparation failure. The indication further indicates that the handover preparation failure is caused by the second cell 122 being configured for downlink operation only.

The second network node 112 may be configured to, e.g. by means of the transmitting module 720 configured to, transmit the indication via the third network node 113.

In some embodiments the third network node 113 is an MME. Then the second network node 112 is configured, e.g. by means of the transmitting module 720 configured to, to transmit the indication comprised in the handover failure message 203*a* over the S1 interface.

The second network node 112 may be configured to, e.g. by means of the transmitting module 720 configured to, transmit the indication comprised in the handover preparation failure message 303 over the X2 interface.

The transmitting module 720 may be a transmitter in the second network node 112.

In some example embodiments the second network node 112 may be configured to be the same network node as the first network node 111. Then the second network node 112 may further be configured to receive the handover request and to transmit the indication within the network node.

The embodiments herein for handling the handover preparation failure between the first cell 121 and the second cell 122 in the wireless communication network 100 may be implemented through one or more processors, such as a processor 780 in the second network node 112 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 790 comprising one or more memory units. The memory 790 is arranged to be used to store for example cell configurations, and computer program code to perform the methods herein when being executed in the second network node 112.

Those skilled in the art will also appreciate that the receiving circuit 710 and transmitting circuit 720 described above may refer to a combination of analogue and digital circuits, and/or one or more processors configured with software and/or firmware, e.g. stored in a memory, that when executed by the one or more processors such as the processor 780 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope, which is defined by the appending claims.

The invention claimed is:

1. A method in a first network node for handling a handover preparation failure between a first cell and a second cell in a wireless communication network, wherein the first cell is served by the first network node and the second cell is served by a second network node, and wherein the second cell is configured for downlink operation only, the method comprising:
   transmitting to the second network node a request for handover of a user equipment from the first cell to the second cell;
   receiving from the second network node an indication, wherein the received indication indicates the handover preparation failure and further indicates that the handover preparation failure is caused by the second cell being configured for downlink operation only; and
   selecting a cell for handover based on the received indication.

2. The method according to claim 1, wherein the selecting of the cell for handover is based on the received indication for a period of time.

3. The method according to claim 1, wherein the selecting of the cell for handover is based on the received indication until the first network node is provided with an indication that the configuration of the second cell has changed to both downlink and uplink operation.

4. The method according to claim 1, wherein the received indication is received via a third network node.

5. The method according to claim 4, wherein the third network node is a Mobility Management Entity (MME), and the received indication is comprised in a handover preparation failure message transmitted over an S1 interface.

6. The method according to claim 1, wherein the received indication is comprised in a handover preparation failure message transmitted over an X2 interface.

7. The method according to claim 1, wherein the second cell is configured for downlink operation only, on a frequency band defined for both downlink and uplink operation.

8. The method according to claim 1, wherein the first network node is the same network node as the second network node and the receiving and the transmitting are performed within the first network node.

9. A first network node configured to handle a handover preparation failure between a first cell and a second cell in a wireless communication network, wherein the first cell is served by the first network node and the second cell is served by a second network node, and wherein the second cell is configured for downlink operation only, the first network node comprising:
   interface circuitry configured to communicatively interface the first network node to at least one of the second network node and a third network node in the wireless communication network; and
   processing circuitry operatively associated with the interface circuitry and configured to:
      transmit to the second network node a request for handover of a user equipment from the first cell to the second cell;
      receive from the second network node an indication, wherein the indication indicates the handover preparation failure and further indicates that the handover preparation failure is caused by the second cell being configured for downlink operation only; and
      select a cell for handover based on the received indication.

10. The first network node according to claim 9, wherein the processing circuitry is configured to select the cell for handover based on the received indication for a period of time.

11. The first network node according to claim 9, wherein the processing circuitry is configured to select the cell for handover based on the received indication until the first network node is provided with an indication that the configuration of the second cell has changed to both downlink and uplink operation.

12. The first network node according to claim 9, wherein the processing circuitry is configured to receive the received indication via the third network node.

13. The first network node according to claim 12, wherein the third network node is a Mobility Management Entity (MME), and the processing circuitry is configured to receive the received indication in a handover preparation failure message transmitted over an S1 interface supported by the interface circuitry.

14. The first network node according to claim 9, wherein the processing circuitry is configured to receive the received indication in a handover preparation failure message transmitted over an X2 interface supported by the interface circuitry.

15. The first network node according to claim 9, wherein the second cell is configured for downlink operation only on a frequency band defined for both downlink and uplink operation.

16. The first network node according to claim 9, wherein the first network node is configured to be the same network node as the second network node and the processing circuitry is configured to transmit the handover request and to receive the indication within the first network node.

17. A method in a second network node for handling a handover preparation failure between a first cell and a second cell in a wireless communication network, wherein the first cell is served by a first network node and the second cell is served by the second network node, and wherein the second cell is configured for downlink operation only, the method comprising:
   receiving from the first network node a request for handover of a user equipment from the first cell to the second cell; and
   transmitting to the first network node an indication, wherein the indication indicates the handover preparation failure and further indicates that the handover preparation failure is caused by the second cell being configured for downlink operation only.

18. The method according to claim 17, wherein the indication is transmitted via a third network node.

19. The method according to claim 18, wherein the third network node is a Mobility Management Entity (MME) and the indication is comprised in a handover failure message transmitted over an S1 interface.

20. The method according to claim 17, wherein the indication is comprised in a handover preparation failure message transmitted over an X2 interface.

21. The method according to claim 17, wherein the second cell is configured for downlink operation only on a frequency band defined for both downlink and uplink operation.

22. The method according to claim 17, wherein the first network node is the same network node as the second network node and the receiving and the transmitting is performed within the first network node.

23. A second network node configured to handle a handover preparation failure between a first cell and a second cell in a wireless communication network, the first cell being configured to be served by a first network node and the second cell being configured to be served by the second network node, and wherein the second cell is configured for downlink operation only, the second network node comprising:
  interface circuitry configured to communicatively interface the second network node to at least one of the first network node and a third network node in the wireless communication network; and
  processing circuitry operatively associated with the interface circuitry and configured to:
    receive from the first network node a request for handover of a user equipment from the first cell to the second cell; and
    transmit to the first network node an indication, wherein the indication indicates the handover preparation failure and further indicates that the handover preparation failure is caused by the second cell being configured for downlink operation only.

24. The second network node according to claim 23, wherein the processing circuitry is configured to transmit the indication via the third network node.

25. The second network node according to claim 24, wherein the third network node is a Mobility Management Entity (MME), and the processing circuitry is configured to transmit the indication in a handover failure message over an S1 interface supported by the interface circuitry.

26. The second network node according to claim 23, wherein the processing circuitry is configured to transmit the indication in a handover preparation failure message over an X2 interface supported by the interface circuitry.

27. The second network node according to claim 23, wherein the second cell is configured for downlink operation only on a frequency band defined for both downlink and uplink operation.

28. The second network node according to claim 23, wherein the second network node is configured to be the same network node as the first network node and the processing circuitry is further configured to receive the handover request and to transmit the indication within the second network node.

* * * * *